United States Patent [19]

Heynderickx et al.

[11] Patent Number: 5,649,471
[45] Date of Patent: Jul. 22, 1997

[54] APPARATUS FOR PREPARING A HOT BEVERAGE

[75] Inventors: Ingrid E. J. R. Heynderickx, Eindhoven; Antonius A. J. Rademaker, Hoogeveen, both of Netherlands

[73] Assignee: U.S. Philips Corporation, New York, N.Y.

[21] Appl. No.: 612,140

[22] Filed: Mar. 7, 1996

[30] Foreign Application Priority Data

Mar. 7, 1995 [EP] European Pat. Off. .............. 95200553

[51] Int. Cl.$^6$ .................................................. A47J 37/00
[52] U.S. Cl. ........................... 99/285; 99/279; 215/365
[58] Field of Search ................. 99/285, 279; 215/365, 215/366

[56] References Cited

U.S. PATENT DOCUMENTS

| | | | |
|---|---|---|---|
| 2,533,578 | 12/1950 | Gomersall | 99/285 |
| 3,044,388 | 7/1962 | Lescure | 99/285 |
| 4,328,740 | 5/1982 | McDonough | 99/285 |
| 4,811,657 | 3/1989 | Rixer | 99/295 |
| 5,239,914 | 8/1993 | Salomon | 99/285 |
| 5,444,539 | 8/1995 | Grift | 215/366 |

*Primary Examiner*—Reginald Alexander
*Attorney, Agent, or Firm*—Ernestine C. Bartlett

[57] ABSTRACT

An apparatus is provided (1) for preparing a hot beverage, comprising a water reservoir (3), means for removing and heating water from the reservoir and transferring it into a brewing chamber (5), and a light-transmissive jug (9) for catching hot liquid emerging from the brewing chamber (5), a wall (13) of the jug (9) being provided with optical means (15) for indicating the volume of liquid contained in the jug (9), wherein the optical means (15) comprise a first graduated scale (159) and a second graduated scale (153), the first scale (159) being clearly visible only when the jug wall temperature is below a reference temperature $T_o$ and the second scale (153) being clearly visible only when the jug wall temperature is above the reference temperature $T_o$, whereby the reference temperature $T_o$ is within the range of $25°$ C.$<T_o<80°$ C., the ratio of the pitch of graduations in the second scale (153) to the pitch of corresponding graduations in the first scale (159) being approximately equal to the liquid yield ratio ($R_L$) of the apparatus. In practice, the optical means (15) may comprise a film (155) of polymer-dispersed liquid crystalline (PDLC) material disposed between the first (159) and second (153) graduated scales.

15 Claims, 2 Drawing Sheets

APPARATUS FOR PREPARING A HOT BEVERAGE

FIELD OF THE INVENTION

The invention relates to an apparatus for preparing a hot beverage, comprising a water reservoir, means for removing and heating water from the reservoir and transferring it into a brewing chamber, and a light-transmissive jug for catching hot liquid emerging from the brewing chamber, a wall of the jug being provided with optical means for indicating the volume of liquid contained in the jug.

The invention also relates to a jug which is suitable for application in such an apparatus.

The term "light-transmissive" is here intended to indicate either transparent or translucent. It is not necessary that the entire jug be light-transmissive, but at least that part of the jug wall in the vicinity of the optical means should be transparent or translucent, so as to allow the level of liquid in the jug to be seen. In practice, such a jug is commonly made of glass, though many other materials can, in principle, be applied for this purpose.

BACKGROUND OF THE INVENTION

An apparatus as described in the opening paragraph is generally known, and can be applied in the preparation of coffee, tea, soup, etc., from particulate material located in the brewing chamber, such as ground coffee beans, tea leaves or soup powder, respectively. Since the taste and color of the beverage are generally determined by the employed quantity of particulate material per unit volume of water, it is desirable to provide the apparatus with some means of indicating the volume of water placed in the reservoir. On the other hand, it is also useful to know how many cups of beverage are contained in the jug at any particular time.

To meet these requirements, a wall of the jug is usually provided with a graduated volume scale. If the jug is used to transfer water from a faucet to the reservoir, then this scale serves to measure the volume of water drawn from the faucet, in accordance with the volume of beverage which the user wants to brew on any particular occasion. The same scale is then additionally intended to serve the purpose of indicating the volume of hot beverage contained in the jug after the brewing process. It is particularly useful if such a scale is directly graduated in terms of "cups" of liquid, rather than in regular fractions of a liter or pint, for example.

However, the provision of such a simple scale can lead to inherent inaccuracy in the preparation of the beverage. This is caused by the fact that the volume $V_f$ of hot beverage derived from the brewing process is generally significantly lower than the volume $V_i$ of faucet water administered to the reservoir to begin with. The ratio $V_f/V_i$ will hereinafter be referred to as the liquid yield ratio $R_L$ of the apparatus, and has a typical value of about 0.8 in the case of a coffee maker. This relatively low value is caused by significant water losses resulting inter alia from steam production, condensation in the brewing chamber, retention of water in the particulate material from which the beverage is brewed, etc. The volume of faucet water initially indicated by the jug scale therefore does not correspond to the volume of derived beverage subsequently indicated by the jug scale.

In this scenario, the user must himself make allowances for water losses in the brewing process. In order to accurately brew a quantity Q of beverage, he must place a quantity $Q/R_L$ of water in the reservoir, and must therefore not only know the value of $R_L$ for the particular apparatus concerned, but must also perform a calculation each time he uses the apparatus. In an attempt to circumvent this problem, one might attempt to provide the wall of the jug with two separate graduated scales, which differ in pitch by a factor $R_L$. However, this can be confusing, particularly to elderly users, and leads to compounded complication if each scale is required to be graduated both in cups and in mugs, as is commonly desired.

SUMMARY OF THE INVENTION

It is an object of the invention to provide a beverage brewing apparatus in which the problems of the preceding paragraph are alleviated. In particular, it is an object of the invention to provide a beverage brewing apparatus which lends itself to the routine preparation of an accurate quantity of beverage, without significant waste or shortfall. Moreover, it is an object of the invention that such an apparatus should be user-friendly. In addition, it is an object of the invention to provide a jug suitable for application in an apparatus as here described, and compatible with the objects here stated.

These and other objects are achieved in an apparatus as specified in the opening paragraph, characterized in that the optical means comprise a first and a second graduated scale, the first scale being clearly visible only when the jug wall temperature is below a reference temperature $T_o$ and the second scale being clearly visible only when the jug wall temperature is above the reference temperature $T_o$, the ratio of the pitch of graduations in the second scale to the pitch of corresponding graduations in the first scale being approximately equal to the liquid yield ratio $R_L$ of the apparatus. The "pitch" of graduations in either (linear) scale is understood to be the mutual separation of consecutive graduations in that scale.

In such an apparatus, the only scale clearly visible when the jug wall is at room temperature (25°–30° C.) is the first scale, which serves to indicate the quantity of faucet water which must be placed in the reservoir in order to obtain a particular quantity of beverage. This first scale does not correspond to the true volume of water contained in the jug, but is expanded by a factor $1/R_L$, so as to make allowances for water-losses in the ensuing brewing process. In other words, if the first scale indicates the volume of faucet water in the jug to be equal to 4 cups (for example), then the actual volume of water in the jug is in fact greater than four cups, and is greater by an amount equal to the expected water losses during brewing. On the other hand, the only scale clearly visible when the jug contains hot beverage (typical temperature in the range 70°–80° C.) is the second scale, which serves to indicate the volume of beverage contained in the jug at any given time. This second scale therefore corresponds to the true volume of liquid in the jug.

In the context of the current invention, appropriate values of $T_o$ are necessarily limited to the range of temperatures at which water is a liquid (0°–100° C.). In practice, $T_o$ should lie in the approximate range 25°–80° C. In particular, a value of $T_o$ in the range 55°–65° C. is preferred.

A practical method of achieving the temperature-dependent selective scale visibility according to the invention employs a polymer-dispersed liquid crystal film of clearance temperature $T_o$, this film being disposed between the first and the second scale in a stacked arrangement. The characteristics of polymer-dispersed liquid crystal (PDLC) materials are elucidated in unpublished European Patent Application EP 94200762.6 (PHN 14.782). In essence, such materials comprise molecules of liquid crystalline material which are dispersed throughout an encapsulating polymeric material, hereinafter referred to as the "bulk polymer". Such dispersion can be achieved in different manners. In particular:

(a) The liquid crystalline material may be directly dispersed throughout the bulk polymer, in the form of microscopic droplets;

(b) The liquid crystalline molecules may first be incorporated via covalent bonds into a host polymeric structure, which is then dispersed throughout the bulk polymer. In any case, PDLC materials are observed to be transparent at temperatures in excess of the so-called Clearance Temperature $T_o$, but are non-transparent at temperatures below $T_o$. As a result, a graduated scale located beneath a film of such PDLC material will only be visible at ambient temperatures in excess of $T_o$.

A particular embodiment of an apparatus in accordance with the invention and employing a PDLC material in this manner is characterized in that the optical means comprise:

(1) a base layer of material which demonstrates a first color and over which the second scale is depicted in a second color, whereby the second color contrasts well with the first color;

(2) a film of PDLC which covers at least the second scale and over which the first scale is depicted in a third color, whereby the third color does not contrast well with the first color.

In such an embodiment, the PDLC film will be non-transparent at temperatures below $T_o$, so that the first scale will then be visible against an opaque (whitish) background. At temperatures above $T_o$, on the other hand, the PDLC film will become transparent, thereby revealing the second scale; however, because the color of the first scale does not contrast well with that of the (newly revealed) base layer, the first scale will now no longer be clearly visible. In this manner, only one of both scales is clearly visible at any time. Since the PDLC film is generally whitish in color at temperatures below $T_o$, it is preferable if the third color contrasts well with white and grey.

In an alternative embodiment to that specified in the previous paragraph, the base layer is omitted, and the third color is chosen so as to contrast poorly with the color of liquid coffee or tea. A suitable such color is black or dark brown. The second color may then be, for example, white or grey. At temperatures in excess of $T_o$, the first scale will then be essentially invisible at points where the beverage forms a backdrop to the optical means.

As already stated hereabove, the liquid crystalline molecules of the PDLC may be dispersed in different manners throughout the bulk polymer. However, a disadvantage of the direct dispersion in case (a) is that the liquid crystalline molecules can diffuse out of the bulk polymer with relative ease, causing gradual deterioration of the optical properties of the PDLC. For this reason, preference is generally given to the indirect dispersion in case (b). It should then be noted that the covalently-bonded liquid crystalline molecules in the employed PDLC material may be incorporated into the host polymeric structure in a number of different manners. For example, such molecules may be inserted in the backbone of the host via two covalent bonds. Alternatively, they may be incorporated as side chains of the host backbone. This second alternative (side chains) is preferable to the first (main chain) in that it generally demonstrates a significantly lower thermal hysteresis (due to the pronounced mobility of the side chains).

A particularly suitable embodiment of the apparatus according to the invention is characterized in that the liquid crystalline molecules of the PDLC are bonded as side-chain groups to a siloxane polymer, which may then be dispersed throughout a UV-polymerizable acrylate matrix, for example. Siloxane polymers are resilient to high temperatures, so that PDLC materials of this type demonstrate a particularly high thermal stability.

A different manner in which to achieve the temperature-dependent selective visibility of the two graduated scales in the optical means, without the aid of a PDLC film, employs a liquid crystal (electronic) display in combination with a microprocessor and a temperature sensor. Depending on the temperature measured by the sensor, the microprocessor drives the liquid crystal display so as to show either a first or a second scale. However, this alternative is relatively expensive and bulky compared to that offered hereabove, and also requires incorporation of a battery.

In a further alternative, a liquid crystalline material is not dispersed throughout a bulk polymer, but is instead encapsulated (as a liquid film) between two sheets of transparent material, thereby forming a closed cell. This cell may then be used instead of the PDLC film discussed hereabove. However, this alternative is generally more expensive than the use of a PDLC film, and does not lend itself as readily to mass production techniques.

In addition to the optical means already elucidated hereabove, the apparatus according to the invention is in no way precluded from having supplementary liquid-level indicator means, such as a separate water-level indicator in the wall of the reservoir, for example. In addition, the first and/or second graduated scale in the optical means may in fact be embodied as a multiple scale, which is graduated in both cups and mugs, or in both liters and pints, for example.

BRIEF DESCRIPTION OF THE DRAWINGS

The invention and its attendant advantages will be further elucidated with the aid of an exemplary embodiment and the accompanying schematic drawings, not of uniform scale, whereby.

DETAILED DESCRIPTION OF THE PREFERRED EMBODIMENTS

Exemplary Embodiment

Figure 1:
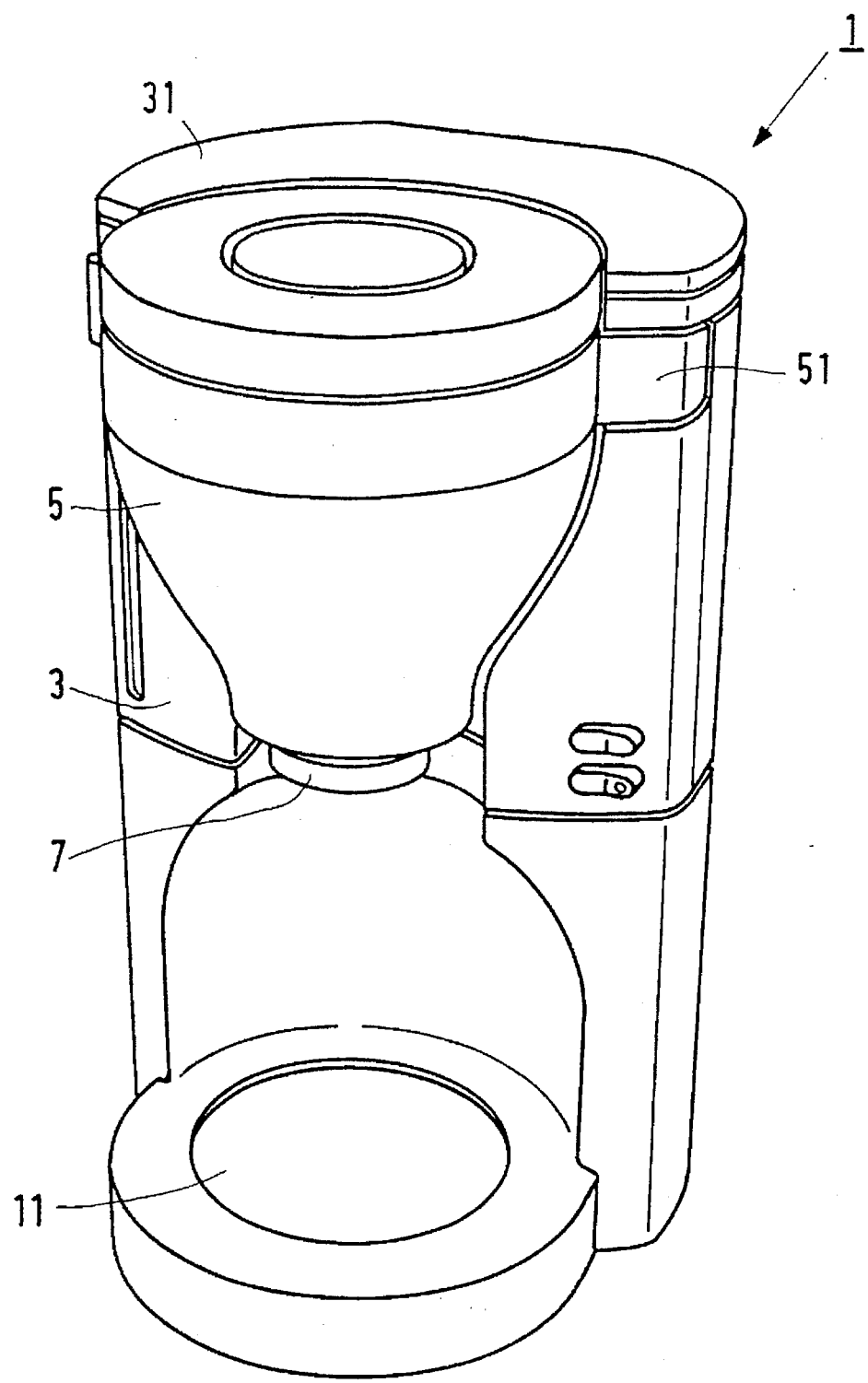
FIG. 1 is a perspective view of an apparatus for preparing a hot beverage, without the accompanying beverage jug.
Figure 2:
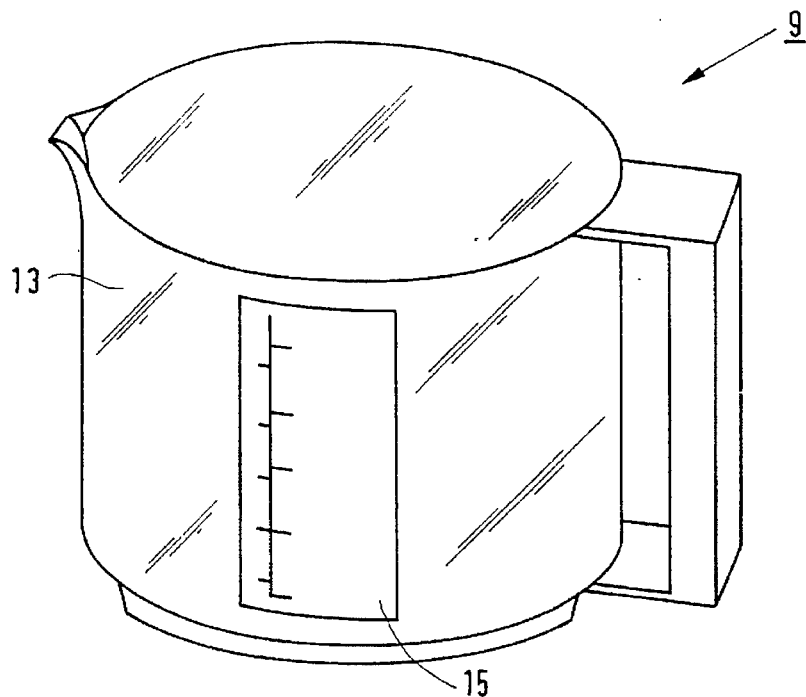
FIG. 2 is a perspective view of a jug in accordance with the present invention and suitable for use in the apparatus shown in FIG. 1.
Figure 3:
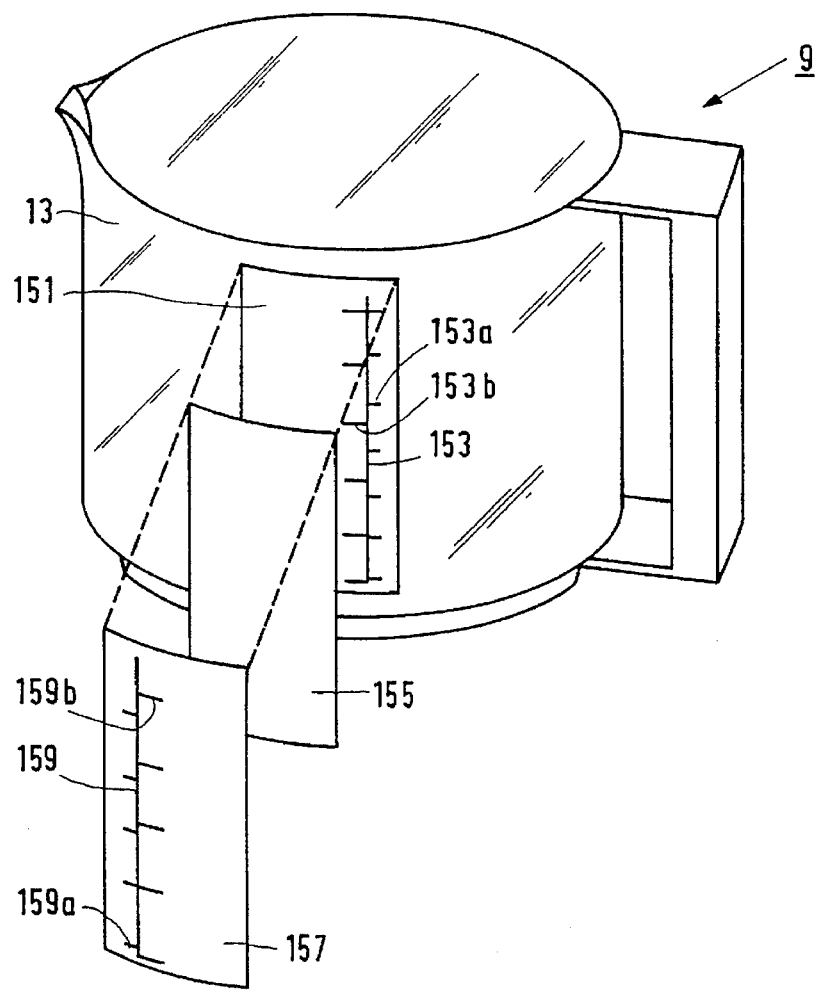
FIG. 3 is an exploded view of part of the jug of FIG. 2.

FIGS. 1–3 illustrate perspective views of various aspects of a beverage brewing apparatus according to the current invention. Corresponding features in the various Figures are denoted by identical reference symbols.

FIG. 1 depicts an apparatus 1 comprising a water reservoir 3 and a brewing chamber 5. The reservoir 3 can be filled with water via the removable lid 31, and the brewing chamber 5 has a hinge 51 which allows it to be swung open for internal access. A paper filter (not depicted) can be placed on the inside of the chamber 5, and a (partially) soluble particulate material such as ground coffee can be disposed in this filter.

The apparatus 1 further comprises (non-depicted) means for removing water from the reservoir 3, heating it, and transferring it to the top portion of the chamber 5. Such means typically comprise a syphon arrangement in connection with an instantaneous electrical water heater, which delivers hot water at a temperature of the order of 95° C. The hot water thus transferred to the chamber 5 falls under gravity through the particulate material in the filter, and emerges from the mouth 7 of the chamber 5 as a hot beverage. A removable light-transmissive jug 9 (not depicted here) can be placed on top of the base plate 11 so as to catch the beverage as it emerges from the mouth 7. If so desired, the base plate 11 can be provided with regulated electrical heating means, so as to keep the accumulated beverage in the jug 9 at an acceptable temperature. This temperature is usually of the order of 70°–80° C.

In general, the quantity $V_f$ of beverage finally deposited in the jug 9 will be significantly smaller than the quantity $V_i$ of water initially placed in the reservoir 3. This is caused by losses resulting from steam production and condensation in the chamber 5, and retention of water by the particulate material in the chamber 5. The ratio $R_L$ of $V_f$ to $V_i$ is typically of the order of 0.8, the exact value depending on the particular construction of the apparatus concerned, and being derivable from calibration trials.

FIG. 2 renders a perspective view of the jug 9, which is made of heat-resistant glass, for example. A wall 13 of the jug 9 is provided with optical means 15 for indicating the volume of liquid in the jug. The jug 9 is dimensioned so as to fit neatly between the chamber mouth 7 and the base plate 11 of the apparatus 1 in FIG. 1.

FIG. 3 gives an exploded view of the optical means 15 shown in FIG. 2. A colored base layer 151 is provided directly on the wall 13. This base layer 151 is thermally stable and chemically inert (at least in the approximate range 0°–120° C.), and comprises a varnish or paint, for example. The base layer 151 is provided with a graduated scale 153, whose color contrasts well with the color of the base layer 151. For example, the layer 151 may be black, and the scale 153 white. The scale 153 may be provided using paint or a transparent transfer film, for example, and should also be thermally stable and chemically inert.

The scale 153 comprises two separate sub-scales 153a, 153b, which are respectively graduated in cups and mugs, on the basis of a conventionally defined or averaged volume of such drinking vessels.

The base layer 151 and scale 153 are covered by a film 155 comprising PDLC material. The film 155 may comprise, for example, 40 wt. % ethoxylated Bisphenol A diacrylate (Sartomer SR 349) and 60 wt. % LCP 137 (Merck-BDH), to which 2 wt. % Irgacure 165 is added (to serve as a photo-initiator), this liquid mixture being applied in a thin film which is subsequently polymerized by exposure to UV light for several minutes. The resulting PDLC material has a clearance temperature $T_o$ of approximately 58° C.

The film 155 is covered by a transparent protective layer 157, comprising a fluorinated ethene propene (FEP) copolymer film, for example. If so desired, this FEP film may be thinly metallized, so as to improve its chemical inertness. The layer 157 is provided with a graduated scale 159, whose color does not contrast well with the color of the base layer 151. For example, the scale 159 may be black or dark brown in the case of a black base layer 151. As in the case of scale 153, the scale 159 may be created using paint or a transparent transfer film, for example, and should be thermally stable and chemically inert.

In analogy to the scale 153, the scale 159 comprises two separate sub-scales 159a, 159b, which are graduated in cups and mugs, respectively. However, in contrast to the scale 153, the pitch of the graduations in the scale 159, i.e. the mutual linear separation of consecutive graduations in a given sub-scale 159a, 159b, is expanded by a factor $1/R_L$. For example, if $R_L=0.8$, then the true volume of liquid contained in the jug 9 exceeds the indicated value according to the scale 159 by 25%.

If the jug 9 is (partially) filled with faucet water at room temperature (typically 20°–30° C.), then the PDLC film 155 will be opaque, and will demonstrate a whitish color. The scale 153 will therefore be eclipsed, but the (black or dark brown) scale 159 will be clearly visible against the (whitish) background of the PDLC film 155. Since the pitch of graduations in the scale 159 is artificially expanded by a factor $1/R_L$, the volume of liquid contained in the jug 9 is actually greater than that indicated by the scale 159. In this way, if the jug 9 is used to transfer water to the reservoir 3, then an excess of water will be placed in the reservoir 3, to an extent which is tailored to the value of $R_L$ for the apparatus 1.

After filling the reservoir 3, the empty jug 9 can be placed on the base plate 11. As the brewing procedure progresses, hot beverage emerging from the chamber mouth 7 will begin to fill the jug 9 with beverage (coffee) at a temperature of 70°–80° C. Once the temperature of the jug wall 13 exceeds 58° C. (the clearance temperature of the film 155), the film 155 will become transparent, thereby revealing the (white) scale 153, which will be clearly visible against the (black) background of the base layer 151, and which indicates the volume of hot beverage in the jug 9. However, the (black or dark brown) scale 159 will now no longer be clearly visible against the newly revealed (black) base layer 151.

When the jug 9 is empty and has cooled sufficiently (i.e. to a temperature below 58° C.), the PDLC film 155 will once again become opaque, and the scale 159 will "reappear".

We claim:

1. An apparatus for preparing a hot beverage, comprising a water reservoir, means for removing and heating water from the reservoir and transferring it into a brewing chamber, and a light-transmissive jug for catching hot liquid emerging from the brewing chamber, a wall of the jug being provided with optical means for indicating the volume of liquid contained in the jug, wherein the optical means comprise a first and a second graduated scale, the first scale being clearly visible only when the jug wall temperature is below a reference temperature $T_o$ and the second scale being clearly visible only when the jug wall temperature is above the reference temperature $T_o$, the ratio of the pitch of graduations in the second scale to the pitch of corresponding graduations in the first scale being approximately equal to the liquid yield ratio of the apparatus.

2. An apparatus according to claim 1, wherein the optical means comprise a liquid crystal film whose clearance temperature is equal to $T_o$, the film being disposed between the first and the second scale in a stacked arrangement.

3. An apparatus according to claim 2, the optical means comprise:
   (1) a base layer of material which demonstrates a first color and over which the second scale is depicted in a second color, whereby the second color contrasts well with the first color;
   (2) a film of polymer-dispersed liquid crystal which covers at least the second scale and over which the first scale is depicted in a third color, whereby the third color does not contrast well with the first color.

4. An apparatus according to claim 3, characterized in that the liquid crystalline molecules of the polymer-dispersed liquid crystal film are covalently bonded to a host polymeric structure.

5. Apparatus according to claim 4, wherein the host polymeric structure is a siloxane polymer to which the liquid crystalline molecules are bonded as side chains.

6. An apparatus according to claim 1 wherein said reference temperature $T_o$ is a temperature within the range of $25°C.<T_o<80°C.$ 7. A light-transmissive jug having a wall which is provided with optical means for indicating the volume of liquid contained in the jug, wherein the optical means comprise a base layer of material which demonstrates a first color and on which a graduated scale is depicted in a second color, whereby the second color contrasts well with the first color, and a film of polymer-dispersed liquid crystal which covers at least the said graduated scale and on which a further graduated scale is depicted in a third color, whereby the third color does not contrast well with the first color, the clearance temperature of the polymer-dispersed liquid crystal lying in the range $25°C.-80°C.$ 8. An apparatus as claimed in claim 2 wherein said reference temperature $T_o$ is within the range of $25°C.<T_o 80°C.$ 9. An apparatus as claimed in claim 3 wherein said reference temperature $T_o$ is within the range of $25°C.<T_o 80°C.$ 10. An apparatus as claimed in claim 4 wherein said reference temperature $T_o$ is within the range of $25°C.<T_o 80°C.$ 11. An apparatus as claimed in claim 5 wherein said reference temperature $T_o$ is within the range of $25°C.<T_o 80°C.$ 12. An apparatus as claimed in claim 2 wherein said reference temperature $T_o$ is within the range of $55°C.<T_o 65°C.$ 13. An apparatus as claimed in claim 3 wherein said reference temperature $T_o$ is within the range of $55°C.<T_o<65°C.$ 14. An apparatus as claimed in claim 4 wherein said reference temperature $T_o$ is within the range of $55°C.<T_o<65°C.$ 15. An apparatus as claimed in claim 5 wherein said reference temperature $T_o$ is within the range of $55°C.<T_o<65°C.$

* * * * *